(12) United States Patent
Ishii

(10) Patent No.: US 9,893,357 B2
(45) Date of Patent: Feb. 13, 2018

(54) CATHODE MIX AND NONAQUEOUS ELECTROLYTE BATTERY

(75) Inventor: Takehiko Ishii, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 939 days.

(21) Appl. No.: 12/143,524

(22) Filed: Jun. 20, 2008

(65) Prior Publication Data

US 2008/0318126 A1 Dec. 25, 2008

(30) Foreign Application Priority Data

Jun. 21, 2007 (JP) .............................. P2007-163870

(51) Int. Cl.
| | |
|---|---|
| *H01M 4/58* | (2010.01) |
| *H01M 4/136* | (2010.01) |
| *H01M 4/62* | (2006.01) |
| *H01M 2/02* | (2006.01) |
| *H01M 4/04* | (2006.01) |
| *H01M 4/1397* | (2010.01) |
| *H01M 10/42* | (2006.01) |

(52) U.S. Cl.
CPC ......... *H01M 4/5825* (2013.01); *H01M 4/136* (2013.01); *H01M 4/622* (2013.01); *H01M 2/022* (2013.01); *H01M 2/0207* (2013.01); *H01M 4/0404* (2013.01); *H01M 4/1397* (2013.01); *H01M 10/4235* (2013.01); *H01M 2200/106* (2013.01)

(58) Field of Classification Search
USPC ....................................................... 429/223
See application file for complete search history.

(56) References Cited

U.S. PATENT DOCUMENTS

| 5,380,606 | A | 1/1995 | Itou et al. |
| 5,811,205 | A | 9/1998 | Andrieu et al. |
| 2002/0045102 | A1* | 4/2002 | Jung et al. .................... 429/324 |
| 2002/0102459 | A1 | 8/2002 | Hosoya et al. |
| 2004/0020763 | A1* | 2/2004 | Kanzaki .................. C08L 23/04 204/250 |
| 2004/0029004 | A1* | 2/2004 | Miyaki ...................... 429/218.1 |
| 2006/0127777 | A1* | 6/2006 | Ihara et al. ................... 429/326 |

(Continued)

FOREIGN PATENT DOCUMENTS

| EP | 1655798 | * 5/2006 | ............ H01M 10/40 |
| EP | 1 655 798 | 10/2006 | |

(Continued)

OTHER PUBLICATIONS

Zhang, Yao et al., "Synthesis of LiNi0.6Co0.2Mn0.2O2 cathode material by a carbonate co-precipitation method and its electrochemical characterization," Solid State Ionics, vol. 177, pp. 3303-3307, 2006.

(Continued)

*Primary Examiner* — Alix E Eggerding
(74) *Attorney, Agent, or Firm* — K&L Gates LLP

(57) ABSTRACT

A cathode mix for nonaqueous electrolyte secondary batteries includes a cathode active material having an olivine crystal structure, and polyvinyl pyrrolidone. Also, a nonaqueous electrolyte secondary battery includes: a cathode; an anode; and a nonaqueous electrolyte, wherein the cathode includes: a cathode active material having an olivine crystal structure; and polyvinyl pyrrolidone.

10 Claims, 14 Drawing Sheets

(56) References Cited

U.S. PATENT DOCUMENTS

| | | | |
|---|---|---|---|
| 2006/0147365 A1* | 7/2006 | Okada et al. | 423/306 |
| 2006/0292451 A1* | 12/2006 | Lee et al. | 429/326 |
| 2007/0009806 A1* | 1/2007 | Kim | 429/329 |
| 2009/0004566 A1* | 1/2009 | Shirane | H01M 4/133 |
| | | | 429/220 |

FOREIGN PATENT DOCUMENTS

| | | |
|---|---|---|
| JP | 7-105970 | 4/1995 |
| JP | 8-078057 | 3/1996 |
| JP | 9-213306 | 8/1997 |
| JP | 3133530 | 11/2000 |
| JP | 2001-110414 | 4/2001 |
| JP | 2002-110162 | 4/2002 |
| JP | 2003-36889 | 2/2003 |
| JP | 2003-168478 | 6/2003 |
| JP | 352397 | 2/2004 |
| JP | 2004-095198 | 3/2004 |
| JP | 3593345 | 9/2004 |
| JP | 2004-281096 | 10/2004 |
| JP | 2005-063825 | 3/2005 |
| JP | 2005-251554 | 9/2005 |
| JP | 2006-134777 | 5/2006 |
| JP | 2008-226765 | 9/2008 |
| KR | 2007-0056765 | 6/2007 |
| WO | 2007/145015 | 12/2007 |

OTHER PUBLICATIONS

Japanese Office Action dated Sep. 29, 2009, for corresponding Japanese Patent Application JP 2007-163870.

Korean Intellectual Property Office, Notice of Reasons for Preliminary Rejection issued in connection with Korean Patent Application No. 10-2008-0047666, dated Apr. 25, 2014. (7 pages).

* cited by examiner

CATHODE MIX AND NONAQUEOUS ELECTROLYTE BATTERY

CROSS REFERENCES TO RELATED APPLICATIONS

The present application claims priority to Japanese Patent Application JP 2007-163870 filed in the Japanese Patent Office on Jun. 21, 2007, the entire contents of which being incorporated herein by reference.

BACKGROUND

The present application relates to a cathode mix and a nonaqueous electrolyte battery. In particular, the present application relates to a cathode mix including a cathode active material having an olivine crystal structure, and a nonaqueous electrolyte battery including the cathode mix.

In recent year, many portable electronic appliances such as camcorders, cellular telephones, and laptop computers are on the market, and reduction in size and weight of these appliances has been demanded. Therefore, intensive research and development have been carried out to increase the energy density of batteries, particularly secondary batteries, as portable power sources for these electronic appliances. Batteries containing nonaqueous electrolytic solutions, in particular, lithium ion secondary batteries provide higher energy densities than known aqueous electrolytic solution secondary batteries such as lead batteries or nickel cadmium batteries. Therefore, expectations for lithium ion secondary batteries are growing, and the market for them is also remarkably growing.

Lithium ion secondary batteries have lightness and high energy densities, so that are suitable for the use in electric vehicles and hybrid vehicles. Therefore, in recent years, intensive studies have been carried out to increase the size and power of the batteries.

Lithium ion secondary batteries for consumer use are usually composed of lithium cobaltate ($LiCoO_2$) as the cathode active material. However, in consideration of its reserves, lithium cobaltate presents problems of price and supply. Therefore, there will be tendency to use low-cost materials involving low risk of supply shortages.

Under such circumstances, lithium iron phosphate ($LiFePO_4$) composed of iron, which is an abundant and low-cost element, is getting a lot of attention lately. However, in comparison with lithium cobaltate which has been used in related art, lithium iron phosphate gives a lower rate of lithium insertion-elimination reaction, and exhibits high electrical resistance during charge and discharge of the battery. Therefore, sufficient charge and discharge capacity cannot be achieved when charged and discharged at a high current because of the increase of overvoltage.

In order to solve the problem, various studies have been made, and, for example, the following methods (1) to (4) are proposed.

(1) The particle diameter of the active material is decreased, and the specific surface area of the material is increased.

(2) A conductive additive such as carbon is supported on the particle surface of the active material.

(3) Carbon black or fibrous carbon is added during preparation of a cathode mix.

(4) The adhesiveness between component members is improved through the use of a binder having a high binding power.

Specifically, the methods of (1) to (4) are described in the following Japanese Patent Application Laid-Open (JP-A) Nos. 2002-110162, 2001-110414, 2003-36889 and 2005-251554.

(1) JP-A-2002-110162 describes that electron conductivity in the cathode is improved by limiting the primary particle diameter of lithium iron phosphate to 3.1 µm or less, and sufficiently increasing the specific surface area of the cathode active material.

(2) JP-A-2001-110414 and JP-A-2003-36889 describe that the charge and discharge capacity when charged and discharged at a high current is increased by supporting conductive fine particles on the particle surfaces of lithium iron phosphate, and improving the active material.

(3) In order to decrease the electrical resistance of a cathode, powder carbon such as carbon black, flake carbon such as graphite, or fibrous carbon is usually added.

(4) JP-A-2005-251554 describes that the use of a binder having a high binding power improves adhesiveness between the cathode active material and the conductive additive, between the cathode active material and the collector, and between the collector and the conductive additive thereby improving the characteristics during charge and discharge at a high current.

SUMMARY

Although the methods of (1) to (4) are effective for improving the high current discharge characteristics in initial stages, there is a problem of cycle deterioration cause by high current discharge.

In order to improve the low electron conductivity of a cathode active material having an olivine crystal structure, the particle diameter of the active material is decreased to increase its specific surface area, or carbon black having a large specific surface area is added to the cathode active material. In this case, a larger amount of the binder is required to stabilize the properties of the slurry to be applied to an electrode. In addition, in order to obtain a slurry suitable for the application, the slurry must be adjusted to have an intended viscosity. Therefore, the amount of the diluent solvent increases as the increase of the amount of the binder.

High current discharge increases the cell temperature, so that the battery inside becomes hot. As a result of this, the binder swells and the distribution of the binder changes in the electrode, which results in the deterioration of the life characteristics during high current discharge.

Accordingly, there is a need for providing a cathode mix and a nonaqueous electrolyte secondary battery which improve the life characteristics of a nonaqueous electrolyte secondary battery including a cathode active material having an olivine crystal structure.

According to an embodiment, there is provided a cathode mix for nonaqueous electrolyte secondary batteries, wherein the cathode mix includes a cathode active material having an olivine crystal structure, and polyvinyl pyrrolidone.

According to another embodiment, there is provided a nonaqueous electrolyte secondary battery including a cathode, an anode, and a nonaqueous electrolyte, wherein the cathode includes a cathode active material having an olivine crystal structure, and polyvinyl pyrrolidone.

In the embodiment, cycle deterioration is improved during high current discharge due to the increase of the amounts of the binder and solvent caused by the techniques regarding the particle diameter, specific surface area, and addition of a large amount of conductive additive required for the use of a cathode active material having an olivine crystal structure for high power applications.

More specifically, according to the embodiment, polyvinyl pyrrolidone is added during preparation of a cathode mix slurry containing a cathode active material having an olivine crystal structure, a conductive additive, and a binder thereby improving the dispersibility of the cathode active material having an olivine crystal structure, conductive additive, and binder, preventing segregation and local swelling of the binder, and allowing the reduction of the loading of the binder and the content of the solvent in the cathode mix slurry. As a result of this, the life characteristics during high current discharge are improved.

According to the embodiment, life characteristics during high current discharge is improved in a nonaqueous electrolyte secondary battery containing a cathode active material having an olivine crystal structure.

Additional features and advantages are described herein, and will be apparent from the following Detailed Description and the figures.

DETAILED DESCRIPTION

Embodiments are described below with reference to the following drawings.

Figure 1:
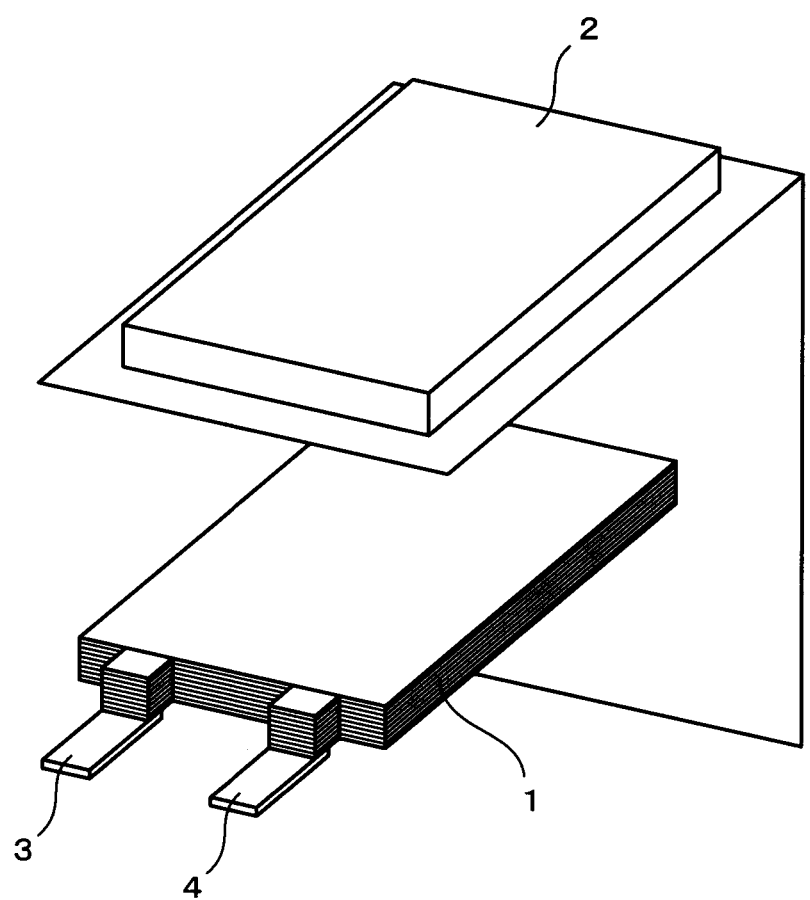
FIG. 1 is an exploded perspective view of an example of the structure of the nonaqueous electrolyte secondary battery according to the first embodiment.

(1) First Embodiment (1-1) Structure of Nonaqueous Electrolyte Secondary Battery FIG. 1 is an exploded perspective view of an example of the structure of the nonaqueous electrolyte secondary battery according to the first embodiment. As shown in FIG. 1, the nonaqueous electrolyte secondary battery is composed of a battery element 1 equipped with a cathode lead 3 and an anode lead 4, and a film cover member 2 accommodating the battery element 1. The size, weight, and thickness of the nonaqueous electrolyte secondary battery can be reduced.

The cathode lead 3 and the anode lead 4 are respectively derived from inside to the outside of the cover member 2 in, for example, the same direction. The cathode lead 3 and the anode lead 4 are respectively composed of a metal material such as aluminum Al, copper Cu, nickel Ni, or stainless steel, and in the form of thin plate or net.

The cover member 2 is composed of, for example, a rectangular aluminum laminate film wherein a nylon film, an aluminum foil, and a polyethylene film have been stacked in this order. The cover member 2 is arranged, for example, such that the polyethylene film is opposed to the battery element 1. The outer edges of the cover member 2 are sealed by fusion or with an adhesive. Although not shown, a contact film is inserted between the cover member 2 and the cathode lead 3, and between the cover member 2 and the anode lead 4 to prevent the ingress of outside air. The contact film is composed of a material which is adhesive to the cathode lead 3 and the anode lead 4, for example, a polyolefin resin such as polyethylene, polypropylene, modified polyethylene, or modified polypropylene. The aluminum laminate film composing the cover member 2 may be replaced with other laminate film, a polymer film such as a polypropylene film, or a metal film.

Figure 2:
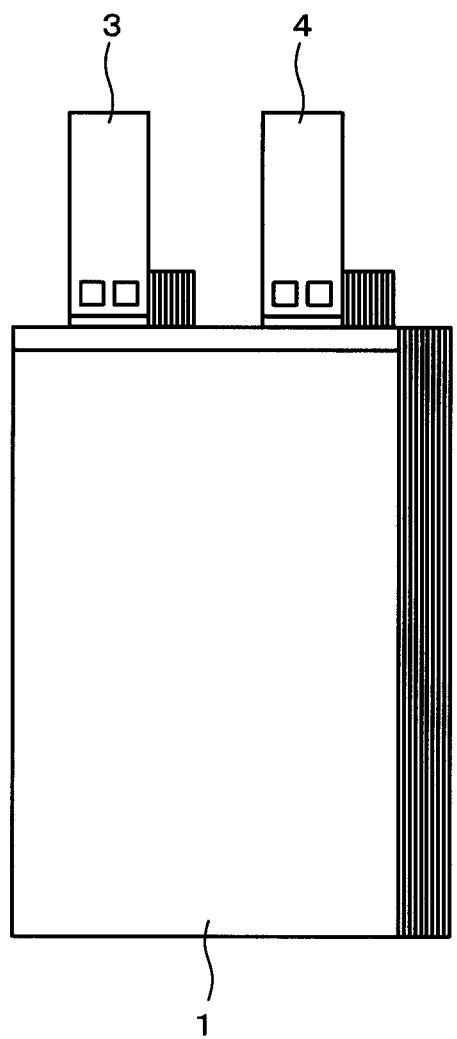
FIG. 2 is a perspective view of an example of the appearance of the battery element.
Figure 3:
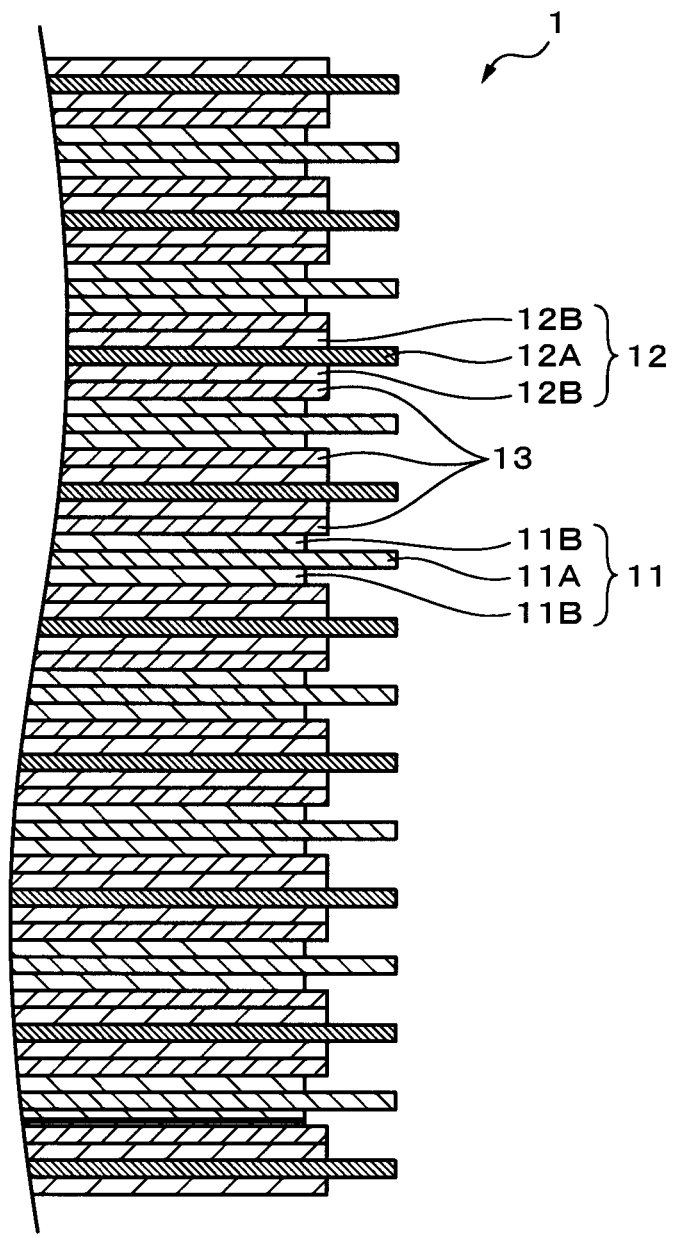
FIG. 3 is a cross sectional view of an example of the structure of the battery element.

FIG. 2 is a perspective view of an example of the appearance of the battery element 1. FIG. 3 is a cross sectional view of an example of the structure of the battery element 1. As shown in FIGS. 2 and 3, the battery element 1 is a stacked electrode assembly wherein cathodes 11 and anodes 12 have been stacked with separators 13 sandwiched between them, and the separators 13 have been impregnated with an electrolytic solution which is a liquid electrolyte.

Figure 4:
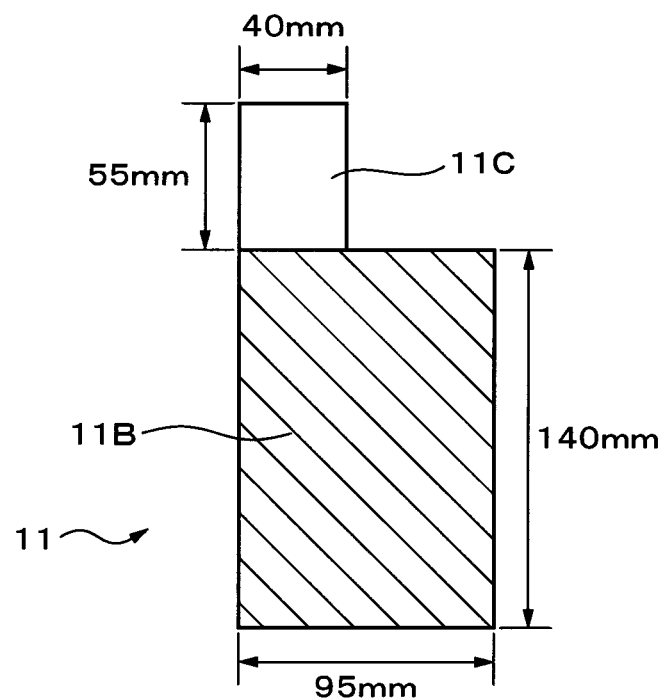
FIG. 4 is a plan view of an example of the cathode.

Each of the cathodes 11 is composed of, for example, a double-sided cathode collector 11A, and cathode mix layers 11B formed on both sides of the cathode collector 11A. As shown in FIG. 4, each of the cathodes 11 is composed of a rectangular electrode, and an exposed collector surface 11C extending from one side of the electrode. The cathode mix layer 11B is not formed on the exposed collector surface 11C so as to expose the cathode collector 11A. The exposed collector surface 11C is electrically connected to the cathode lead 3. Although not shown, a cathode mix layer 11B may be formed on only one side of a cathode collector 11A. The cathode collector 11A is composed of, for example, a metal foil such as an aluminum foil.

The cathode mix layer 11B is composed of one or more cathode active materials having an olivine crystal structure, polyvinyl pyrrolidone (PVP), and, as necessary, a conductive additive such as graphite and a binder such as polyvinylidene fluoride (PVdF). In order to achieve high power characteristics, the cathode active material having an olivine crystal structure preferably has a primary particle diameter of, for example, 0.1 μm to 1.0 μm.

Examples of the cathode active material having an olivine type structure include the phosphate compound having an average composition expressed by Chemical Formula 1:

  (Chemical Formula 1)

wherein M1 represents at least one selected from the group consisting of cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr; x is a value within the range of $0.9 \leq x \leq 1.1$; the composition of lithium varies depending on the state of charge and discharge, and x is a value in the state of full discharge.

More specifically, for example, the iron phosphate lithium compound having an average composition expressed by Chemical Formula 2 may be used:

$$Li_xFe_{1-y}M2_yPO_4 \quad \text{(Chemical Formula 2)}$$

wherein M2 represents at least one selected from the group consisting of manganese Mn, nickel Ni, cobalt Co, zinc Zn, and magnesium Mg; x is a value within the range of 0.9≤x≤1.1; the composition of lithium varies depending on the state of charge and discharge, and x is a value in the state of full discharge.

Examples of the technique involving the use of polyvinyl pyrrolidone (PVP) is described in, for example, Japanese Unexamined Patent Application Publication No. 2004-281096 (hereinafter referred to as Reference 1). In the technique, a conductive additive such as carbon black or graphite and a solvent are dispersed in a jet mill together with polyvinyl pyrrolidone (PVP) as a dispersant, and pulverized within a short period of time. This techniques prevents the contamination with zirconia, which is a component of beads used in a bead mill employed in related art, and improves the cycling characteristics. Reference 1 does not include specific description about the structure of the cathode including a cathode active material having an olivine structure and polyvinyl pyrrolidone. In addition, the effect of the structure in improving the life characteristics during high current discharge at, for example, 5 C or 10 C is different from the effect described in Reference 1.

The content of polyvinyl pyrrolidone (PVP) in the cathode mix is preferably from 0.111 wt % to 1.124 wt % with reference to the cathode active material. If the content is less than 0.111 wt %, the life characteristics during high current discharge are poorly improved. If the content is greater than 1.124 wt %, the initial high current discharge capacity and life characteristics are poorly improved. The amount of polyvinyl pyrrolidone (PVP) may be, for example, measured as described below. In the first place, the cathode mix is immersed in an organic solvent such as N-methylpyrrolidone (NMP), and polyvinylidene fluoride (PVdF) as a binder and polyvinyl pyrrolidone (PVP) are dissolved in the solvent. Subsequently, a solid mixture of polyvinylidene fluoride (PVdF) and polyvinyl pyrrolidone (PVP) is measured by NMR (Nuclear Magnetic Resonance). In the NMR measurement, polyvinylidene fluoride (PVdF) and polyvinyl pyrrolidone (PVP) exhibit different peaks. The spectra of respective peaks are integrated, and the abundance ratio between polyvinylidene fluoride (PVdF) and polyvinyl pyrrolidone (PVP) is determined based on the area ratio. The amount of polyvinyl pyrrolidone (PVP) is calculated from the abundance ratio and the weight of the solid mixture.

The polyvinyl pyrrolidone (PVP) used herein may have a weight average molecular weight of, for example, 35,000 to 360,000. The weight average molecular weight may be determined by GPC (Gel Permeation Chromatography).

Figure 5:
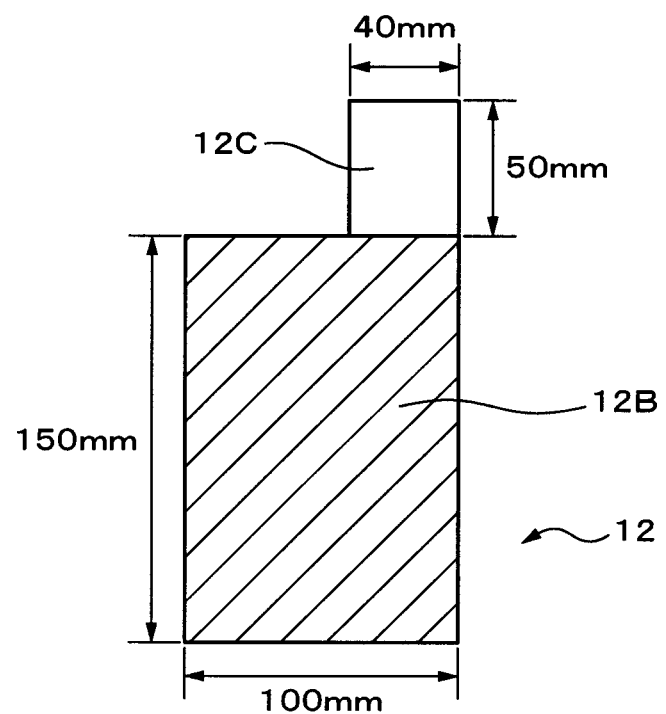
FIG. 5 is a plan view of an example of the anode.

Each of the anodes 12 is composed of, for example, a double-sided anode collector 12A, and anode mix layers 12B formed on both sides of the anode collector 12A. As shown in FIG. 5, each of the anodes 12 is composed of a rectangular electrode, and an exposed collector surface 12C extending from one side of the electrode. The anode mix layer 12B is not formed on the exposed collector surface 12C so as to expose the anode collector 12A. The exposed collector surface 12C is electrically connected to the anode lead 4. Although not shown, an anode mix layer 12B may be formed on only one side of an anode collector 12A. The anode collector 12A is composed of, for example, a metal foil such as a copper foil.

The anode mix layer 12B includes one or more anode active materials capable of storing and releasing lithium (Li), and, as necessary, further includes a conductive additive such as graphite, and a binder such as polyvinylidene fluoride (PVdF).

In the nonaqueous electrolyte secondary battery, the anodes 12 capable of storing and releasing lithium (Li) have a higher electrochemical equivalent than the cathodes 11 so as to prevent deposition of the lithium metal on the anodes 12 during charge.

Examples of the anode active material capable of storing and releasing lithium include carbon materials such as non-easy-graphitizable carbon, easy-graphitizable carbon, graphite, pyrolytic carbons, cokes, vitreous carbons, burned organic polymer compounds, carbon fiber, and active carbon. Examples of cokes include pitch cokes, needle cokes, and petroleum cokes. Burned organic polymer compounds are prepared by burning and carbonizing polymer materials such as phenolic resins or furan resins at an appropriate temperature. Some of them are classified into non-easy-graphitizable carbon or easy-graphitizable carbon. Examples of polymer materials include polyacetylene and polypyrrole. These carbon materials are preferable because they slightly change in their crystal structure during charge and discharge, provide high charge and discharge capacities, and provide favorable cycling characteristics. In particular, graphite is preferable because it has a high electrochemical equivalent, and provides a high energy density. Non-easy-graphitizable carbon is also preferable because it provides excellent characteristics. In addition, those having a low charge and discharge potential, specifically a potential near the potential of the lithium metal, are preferable for facilitating the increase of the energy density of the battery.

Examples of the anode active material capable of storing and releasing lithium include materials composed of a metal element and/or a semimetal element and capable of storing and releasing lithium Li. Through the use of the material, a high energy density is achieved. It is more preferable that the material be used together with a carbon material so as to achieving a high energy density and excellent cycling characteristics. The anode active material may be a simple substance, alloy, or compound of a metal element or a semimetal element, and may be at least partially composed of one or more phases of these elements. The alloy used in the present application may be composed two or more metal elements, or one or more metal elements and one or more semimetal elements. The alloy may contain a nonmetal element. The alloy may be, for example, a solid solution, an eutectic mixture, an intermetallic compound, or a mixture of two or more of them.

Examples of the metal element or semimetal element composing the anode active material include magnesium Mg, boron B, aluminum Al, gallium Ga, indium In, silicon Si, germanium Ge, tin Sn, lead Pb, bismuth Bi, cadmium Cd, silver Ag, zinc Zn, hafnium Hf, zirconium Zr, yttrium Y, palladium Pd, and platinum Pt. These elements may be crystalline or amorphous.

Among them, the anode active material is preferably composed of a metal element or a semimetal element of Group 4B of the short form periodic table, and particularly preferably composed of silicon Si and/or tin Sn. Silicon Si and tin Sn are highly capable of storing and releasing lithium Li thereby providing high energy densities.

Examples of the tin Sn alloy include those composed of tin Sn and at least one second constituent element selected from the group consisting of silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr. Examples of the silicon Si alloy include those composed of silicon Si and at least one second constituent element selected from the group consisting of tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr.

Examples of the tin Sn compound or silicon Si compound include those containing oxygen O or carbon C. These compounds may contain the above-described second constituent element besides tin Sn or silicon Si.

Other examples of the anode active material capable of storing and releasing lithium Li include other metal compounds and polymer materials. Examples of the other metal compound include oxides such as $MnO_2$, $V_2O_5$, and $V_6O_{13}$, sulfides such as NiS and MoS, and lithium nitrides such as $LiN_3$. Examples of the polymer material include polyacetylene, polyaniline, and polypyrrole.

Figure 6:
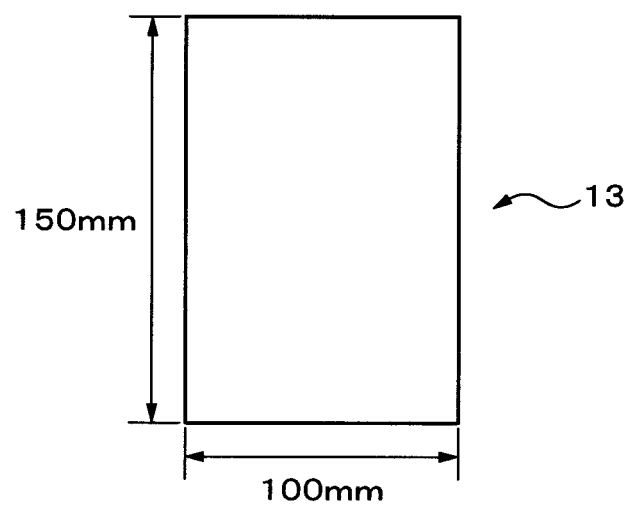
FIG. 6 is a plan view of an example of the separator.

The separator 13 is not particularly limited as long as it has, for example, a rectangular shape as shown in FIG. 6, electrical stability, chemical stability against the cathode active material, anode active material, and solvent, and no electrical conductivity. For example, the separator 13 may be a nonwoven polymer fabric, a porous film, or a sheet of glass or ceramic fibers, which may be stacked in layers. In particular, a porous polyolefin film is preferable, and the film may be combined with a heat-resistant material composed of, for example, polyimide and glass or ceramic fibers.

The electrolytic solution contains a solvent and an electrolyte salt dissolved in the solvent. The solvent may be a cyclic carbonate such as ethylene carbonate or propylene carbonate. In order to improve the cycling characteristics, the solvent is preferably ethylene carbonate or propylene carbonate, and particularly preferably a mixture of them.

In order to achieve high ion conductivity, the solvent preferably contains, in addition to the cyclic carbonate, a chain carbonate such as diethyl carbonate, dimethyl carbonate, ethylmethyl carbonate, or methylpropyl carbonate.

The solvent preferably contains 2,4-difluoroanisole or vinylene carbonate, because 2,4-difluoroanisole improves the discharge capacity, and vinylene carbonate improves the cycling characteristics. In order to improve both the discharge capacity and cycling characteristics, a mixture of 2,4-difluoroanisole and vinylene carbonate is preferable.

Other examples of the solvent include, butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropylonitrile, N,N-dimethylformamide, N-methylpyrrolidinone, N-methyloxazolidinone, N,N-dimethylimidazolidinone, nitromethane, nitroethane, sulfolane, dimethylsulfoxide and trimethyl phosphate.

For some electrodes, in order to improve the reversibility of the electrode reaction, it is preferable that at least a portion of the hydrogen atoms of the nonaqueous solvent be substituted with fluorine atoms.

Example of the electrolyte salt include lithium salts, which may be used alone or two or more of them. Specific examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, lithium difluoro [oxolato-O,O'] borate, lithium bisoxalate borate, and LiBr. Among them, $LiPF_6$ is preferable because it provides high ion conductivity and improves the cycling characteristics.

(1-2) Making of Nonaqueous Electrolyte Secondary Battery

The nonaqueous electrolyte secondary battery having the above-described structure may be made, for example, as follows.

(Making of Cathode)

The cathode 11 is prepared as follows. In the first place, for example, a cathode active material, a binder, a conductive additive, and polyvinyl pyrrolidone (PVP) are mixed to make a cathode mix, and the cathode mix is dispersed in a solvent such as N-methylpyrrolidone (NMP) to make a cathode mix slurry paste. Subsequently, the paste is applied to the both sides of the cathode collector 11A, dried, and pressed to form the cathode mix layers 11B. Thereafter, the assembly is cut into, for example, a shape as shown in FIG. 4, and thus the cathode 11 is obtained.

(Making of Anode)

The anode 12 is prepared as follows. In the first place, for example, an anode active material, a binder, and a conductive additive are mixed to make an anode mix, and the anode mix is dispersed in a solvent such as N-methylpyrrolidone (NMP) to make an anode mix slurry paste. Subsequently, the paste is applied to the both sides of the anode collector 12A, dried, and pressed to form the anode mix layers 12B. Thereafter, the assembly is cut into, for example, a shape as shown in FIG. 5, and thus the anode 12 is obtained.

(Making of Battery Element)

The battery element 1 is made as follows. In the first place, a microporous polypropylene film or the like is cut into a shape as shown in FIG. 6 to make a separator 13. Subsequently, a plurality of sheets of the anode 12, cathode 11, and separator 13 obtained as described above are stacked in the order of, for example, anode 12, separator 13, the cathode 11, - - - , cathode 11, separator 13, anode 12 as shown in FIG. 3 to make a battery element.

Thereafter, the exposed collector surface 11c of the cathode 11 is welded to the cathode lead 3. In the same manner, the exposed collector surface 12C of the anode 12 is welded to the anode lead 4. Subsequently, after impregnating the battery element 1 with the electrolytic solution, the battery element 1 is sandwiched between the flaps of the cover member 2, and the outer edges of the cover member 2 is sealed by, for example, fusion. The cathode lead 3 and the anode lead 4 extend to the outside of the cover member 2 through the fused portion so as to serve as cathode and anode terminals. As described above, the intended nonaqueous electrolyte secondary battery is obtained.

As described above, according to the present application, polyvinyl pyrrolidone (PVP) is added during preparation of a cathode mix slurry containing a cathode active material having an olivine crystal structure, a conductive additive, and a binder thereby improving the dispersibility of the cathode active material having an olivine crystal structure, conductive additive, and binder, preventing segregation and local swelling of the binder, and reducing the loading of the binder and the content of the solvent in the cathode mix slurry. As a result of this, the life characteristics during high current discharge are improved.

(2) Second Embodiment

A second embodiment is described below. The nonaqueous electrolyte secondary battery according to the second embodiment is different from the secondary battery according to the first embodiment in that it includes a gel electrolyte layer in place of the electrolytic solution which is a liquid electrolyte. The same components as those of the first embodiment are denoted by the same reference numerals, and the explanations thereof are omitted.

(2-1) Structure of Nonaqueous Electrolyte Secondary Battery

Figure 7:
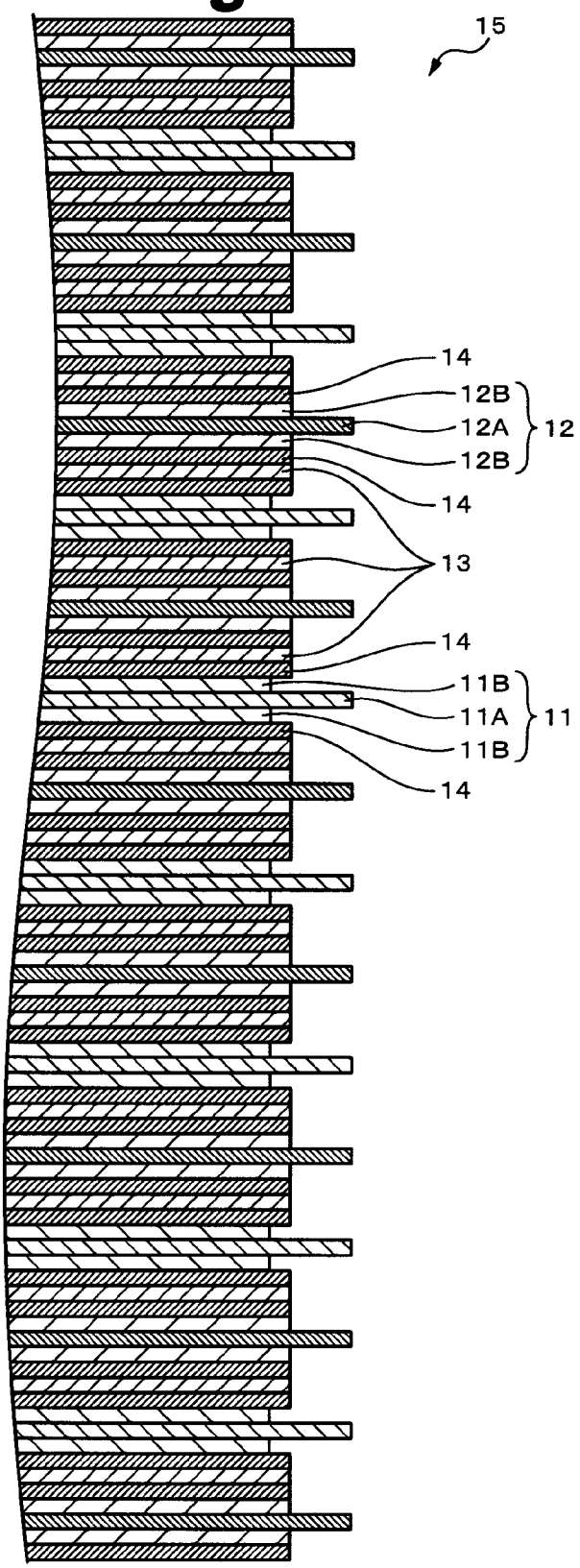
FIG. 7 is a cross sectional view of an example of the structure of the battery element used in the nonaqueous electrolyte secondary battery according to the second embodiment.

FIG. 7 is a cross sectional view of an example of the structure of the battery element used in the nonaqueous electrolyte secondary battery according to the second embodiment. A battery element 15 is composed of cathodes 11 and anodes 12 which have been stacked with separators 13 and electrolyte layers 14 sandwiched between them.

Each of the electrolyte layers 14 includes an electrolytic solution and a polymer compound serving as a carrier regaining the electrolytic solution, and in the form of so-called gel. In order to achieve high ion conductivity and prevent liquid leakage from the battery, the electrolyte layers 14 are preferably in gel state. The ingredients of the electrolytic solution such as a solvent and an electrolyte salt are the same as those of the nonaqueous electrolyte secondary battery according to the first embodiment. Examples of the polymer compound include polyacrylonitrile, polyvinylidene fluoride (PVdF), a copolymer of vinylidene fluoride with hexafluoro propylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. In particular, from the viewpoint of electrochemical stability, polyacrylonitrile, polyvinylidene fluoride (PVdF), polyhexafluoropropylene, and polyethylene oxide are preferable.

(2-2) Making of Nonaqueous Electrolyte Secondary Battery

The nonaqueous electrolyte secondary battery having the above-described structure may be made, for example, as follows.

In the first place, a precursory solution containing a solvent, an electrolyte salt, a polymer compound, and a mixed solvent is applied to each of the cathodes 11 and the anodes 12, and the mixed solvent is volatilized to form the electrolyte layers 14. The subsequent steps are the same as those in the first embodiment, except that the cathodes 11 and the anodes 12 having the electrolyte layers 14 are used. Thus a nonaqueous electrolyte secondary battery is obtained.

According to the second embodiment, the same effect as the first embodiment is achieved.

(3) Third Embodiment (3-1) Structure of Nonaqueous Electrolyte Secondary Battery The secondary battery according to the third embodiment is described below with reference to FIGS. 8 to 9.

Figure 8:
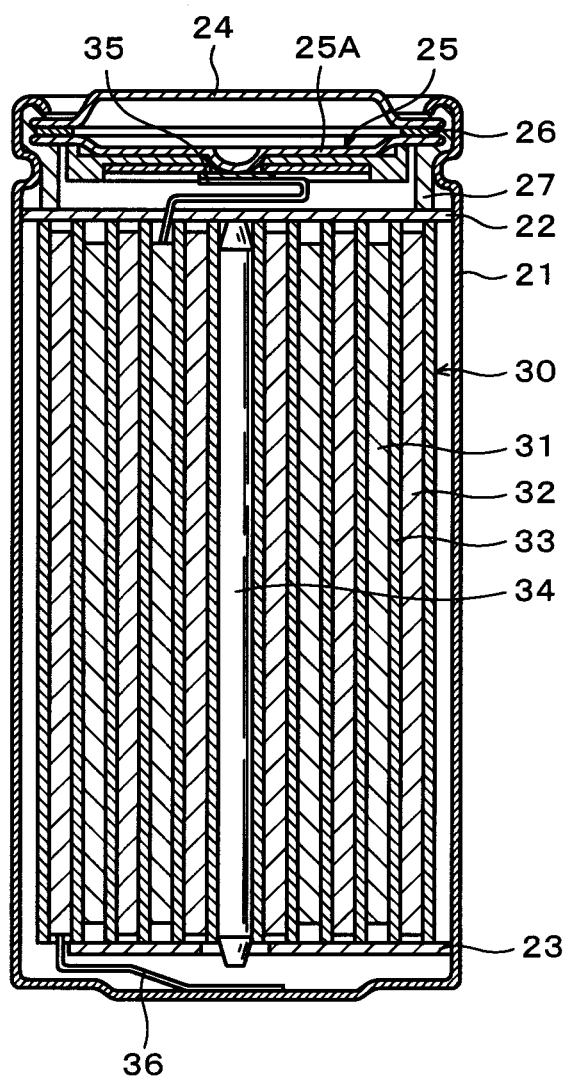
FIG. 8 is a cross sectional view of an example the structure of the nonaqueous electrolyte secondary battery according to the third embodiment.

FIG. 8 is a cross sectional view of an example the structure of the nonaqueous electrolyte secondary battery according to the third embodiment. The secondary battery is a so-called cylindrical battery, and composed of a almost hollow cylindrical battery can 21 containing a wound electrode assembly 30 composed of a cathode 31 in band form and an anode 32 in band form wound with a separator 33 sandwiched between them. The separator 33 has been impregnated with an electrolytic solution which is a liquid electrolyte. The battery can 21 is composed of, for example, iron Fe plated with nickel Ni. One end of the battery can 21 is closed, and the other end is open. In the battery can 21, a pair of insulating plates 22 and 23 is respectively arranged perpendicular to the winding periphery face, so that the wound electrode assembly 30 is sandwiched between the insulating plates 22 and 23.

To the open end of the battery can 21, a battery cover 24, a safety valve device 25 and a PTC (Positive Temperature Coefficient) device 26 attached to the inside of the battery cover 14 are crimped via a gasket 27. The battery can 21 is hermetically sealed. The battery cover 24 is, for example, composed of the same material as that of the battery can 21. The safety valve device 25 is electrically connected to the battery cover 24 through the PTC device 26. When the pressure in the battery exceeds a certain level by, for example, internal short circuit or external heating, a disk plate 25A flips so as to cut the electrical connection between the battery cover 24 and the wound electrode assembly 30. When temperature rises, the resistance of the PTC device 26 increases to limit the current thereby preventing abnormal heat generation caused by a large current. The gasket 27 is composed of, for example, an insulating material, and has a surface coated with asphalt.

The wound electrode assembly 30 is, for example, wound around a center pin 34. The cathode 31 in the wound electrode assembly 30 is connected to a cathode lead 35 composed of, for example, aluminum Al, and the anode 32 is connected to an anode lead 36 composed of, for example, nickel Ni. The cathode lead 35 has been welded to the safety valve device 25 so as to be electrically connected to the battery cover 24, and the anode lead 36 has been welded to be electrically connected to the battery can 21.

Figure 9:
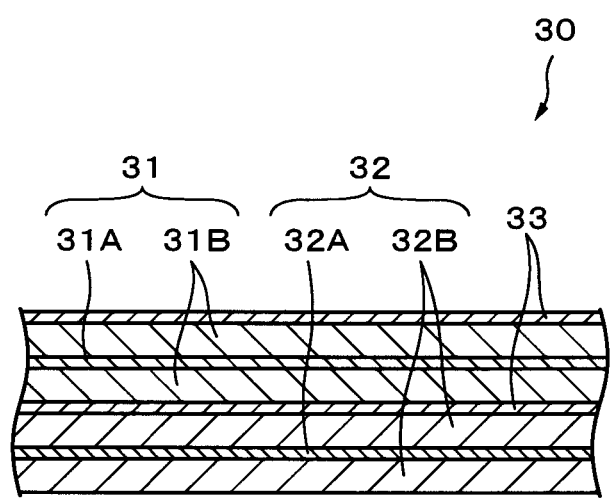
FIG. 9 is an enlarged cross sectional view of a portion of the wound electrode assembly shown in FIG. 8.

FIG. 9 is an enlarged cross sectional view of a portion of the wound electrode assembly 30 shown in FIG. 8. The wound electrode assembly 30 is composed of a cathode 31 and an anode 32 which have been stacked and wound with a separator 33 sandwiched between them.

The cathode 31 is composed of, for example, a cathode collector 31A, and cathode mix layers 31B formed on the both sides of the cathode collector 31A. The anode 32 is composed of, for example, an anode collector 32A, and anode mix layers 32B formed on the both sides of the anode collector 32A. The structures of the cathode collector 31A, cathode mix layers 31B, anode collector 32A, anode mix layer 32B, separator 33, and electrolytic solution are the same as those of the cathode collector 11A, the cathode mix layer 11B, anode collector 12A, anode mix layer 12B, separator 13, and electrolytic solution according to the first embodiment.

(3-2) Making of Nonaqueous Electrolyte Secondary Battery

The nonaqueous electrolyte secondary battery having the above-described structure may be made, for example, as follows.

The cathode 31 is made as follows. In the first place, a cathode active material, a conductive additive, a binder, and polyvinyl pyrrolidone (PVP) are mixed to make a cathode mix, and the cathode mix is dispersed in a solvent such as N-methylpyrrolidone (NMP) to make a cathode mix slurry. Subsequently, the cathode mix slurry is applied to the cathode collector 31A, the solvent is dried, and then the cathode collector 31A is compression-molded with a roll pressing machine or the like to form the cathode mix layer 31B. Thus the cathode 31 is obtained.

The anode 32 is made as follows. In the first place, an anode active material and a binder are mixed to make an anode mix, and the anode mix is dispersed in a solvent such as N-methylpyrrolidone (NMP) to make an anode mix slurry. Subsequently, the anode mix slurry is applied to the anode collector 32A, the solvent is dried, and then the anode collector 32A is compression-molded with a roll pressing machine or the like to form the anode mix layer 32B. Thus the anode 32 is obtained.

Subsequently, the cathode lead 35 is attached to the cathode collector 31A by, for example, welding, and the anode lead 36 is attached to the anode collector 32A by, for example, welding. Thereafter, the cathode 31 and the anode 32 are wound with the separator 33 sandwiched between them, and the tip of the cathode lead 35 is welded to the safety valve device 25, and the tip of the anode lead 36 is welded to the battery can 21. The cathode 31 wound together with the anode 32 is sandwiched between the pair of insulating plates 22 and 23, and contained in the battery can 21. After the cathode 31 and anode 32 are contained in the battery can 21, the electrolytic solution is injected into the battery can 21, and the separator 33 is impregnated with the electrolytic solution. Subsequently, to the open end of the battery can 21, the battery cover 24, safety valve device 25, and PTC device 26 are crimped via the gasket 27. As a result of this, the secondary battery shown in FIG. 8 is obtained.

According to the third embodiment, the same effect as the first embodiment is achieved.

EXAMPLES

The present application is illustrated with reference to the following examples, but the present application is not limited to these examples.

Example 1-1

(Making of Cathode)

A cathode was made as follows. In the first place, 89.5 parts by weight of lithium iron phosphate powder containing 3 wt % of carbon, 5 parts by weight of polyvinylidene fluoride (PVdF), 5 parts by weight of carbon black, 0.5 parts by weight of polyvinyl pyrrolidone (PVP) [K90 manufactured by Wako Pure Chemical Industries, Ltd.], and an appropriate amount of N-methylpyrrolidone (NMP) were mixed in a mixer. N-methylpyrrolidone (NMP) was added to the mixer and dispersed therein to achieve an intended viscosity, and thus a cathode mix slurry was obtained. The cathode mix slurry was applied to the both sides of an aluminum foil having a thickness of 15 µm, dried, and pressed to form a cathode mix layer. At that time, about 30 mm areas on the both sides of the aluminum foil were remained exposed. The edges of the coated areas on the both sides were generally aligned. Thereafter, the foil was cut into a shape shown in FIG. 4, and thus a cathode was obtained.

(Making of Anode)

An anode was made as follows. In the first place, 90 parts by weight of artificial graphite, 5 parts by weight of polyvinylidene fluoride (PVdF), 5 parts by weight of carbon black, and an appropriate amount of N-methylpyrrolidone (NMP) were mixed to make an anode mix slurry. Subsequently, the anode mix slurry was applied to the both sides of a copper foil having a thickness of 15 µm, dried, and pressed to form an anode mix layer. At that time, about 30 mm areas on the both sides of the copper foil were remained exposed. The edges of the coated areas on the both sides were generally aligned. Thereafter, the foil was cut into a shape shown in FIG. 5, and thus an anode was obtained.

Before the application and formation of the anode mix layer and cathode mix layer on the collectors, the lithium storage capacity of the anode mix and the lithium release of the cathode mix per unit weight were respectively determined so as to prevent the lithium storage capacity of the anode mix layer per unit area from exceeding the lithium release capacity of the cathode mix layer per unit area.

(Making of Battery Element)

The battery element was made as follows. In the first place, a microporous polypropylene film having a thickness of 25 µm was cut into a shape as shown in FIG. 6, and used as a separator. Subsequently, 9 sheets of the anode, 8 sheets of the cathode, and 16 sheets of the separator obtained as described above were stacked in the order of anode, separator, cathode, - - - , cathode, separator, and anode as shown in FIG. 3. As a result of this, a battery element composed of 16 unit stacks each composed of a cathode mix layer, a separator, and an anode mix layer was obtained. The upper and lower outermost layers of the battery element are anode mix layers. These anode mix layers are not opposed to cathodes, so that will not contribute to the battery reaction. During stacking, the relative positions of the negative and cathodes were adjusted such that the projected area of the cathode mix layer was smaller than the projected area of the anode mix layer as seen from the stacking direction.

Subsequently, as shown in FIG. 2, 8 sheets of the exposed collector surface of the cathode were simultaneously ultrasonically welded to a cathode lead made of aluminum. In the same manner, 9 sheets of the exposed collector surface of the anode were simultaneously ultrasonically welded to an anode lead made of nickel. Subsequently, $LiPF_6$ was dissolved in a mixed solvent composed equal amounts of ethylene carbonate (EC) and dimethyl carbonate (DMC) in the proportion of 1 mol/l to make a nonaqueous electrolytic solution. After impregnating the battery element with the nonaqueous electrolytic solution, the battery element was covered with a cover member made of an aluminum laminate film composed of a resin layer, an aluminum layer, and a resin layer, and the openings of the cover member were heat-sealed under reduced pressure. At that time, the cathode and anode leads were derived to the outside of the cover member through the heat-sealed portions so as to serve as cathode and anode terminals. As described above, the intended nonaqueous electrolyte secondary battery was obtained.

Example 1-2

A nonaqueous electrolyte secondary battery was obtained in the same manner as Example 1-1, except that 84.5 parts by weight of lithium iron phosphate powder and 10 parts by weight of polyvinylidene fluoride (PVdF) were used.

Example 1-3

A cathode was made as follows. In the first place, 89.5 parts by weight of lithium manganese iron phosphate powder containing 3 wt % of carbon, 5 parts by weight of polyvinylidene fluoride (PVdF), 5 parts by weight of carbon black, 0.5 parts by weight of polyvinyl pyrrolidone (PVP) [K90 manufactured by Wako Pure Chemical Industries, Ltd.], and an appropriate amount of N-methylpyrrolidone (NMP) were mixed in a mixer. N-methylpyrrolidone (NMP) was added to the mixer and dispersed therein to achieve an intended viscosity, and thus a cathode mix slurry was obtained. The cathode mix slurry was applied to the both sides of an aluminum foil having a thickness of 15 µm, dried, and pressed to form a cathode mix layer. At that time, about 30 mm areas on the both sides of the aluminum foil were remained exposed. The edges of the coated areas on the both sides were generally aligned. Thereafter, the foil was cut into a shape shown in FIG. 4, and thus a cathode was obtained.

A nonaqueous electrolyte secondary battery was obtained in the same manner as Example 1-1, except that the cathode was made as described above.

Example 1-4

A cathode was made as follows. In the first place, lithium iron phosphate powder containing 3 wt % of carbon was mixed with lithium manganate having a spinel crystal structure at a ratio of 50:50 in terms of mass ratio to make a cathode active material, and 89.5 parts by weight of the cathode active material, 5 parts by weight of polyvinylidene fluoride (PVdF), 5 parts by weight of carbon black, 0.5 parts by weight of polyvinyl pyrrolidone, and an appropriate amount of N-methylpyrrolidone (NMP) were mixed in a mixer. N-methylpyrrolidone (NMP) was added to the mixer and dispersed therein to achieve an intended viscosity, and thus a cathode mix slurry was obtained. The cathode mix slurry was applied to the both sides of an aluminum foil having a thickness of 15 μm, dried, and pressed to form a cathode mix layer. At that time, about 30 mm areas on the both sides of the aluminum foil were remained exposed. The edges of the coated areas on the both sides were generally aligned. Thereafter, the foil was cut into a shape shown in FIG. 4, and thus a cathode was obtained.

A nonaqueous electrolyte secondary battery was obtained in the same manner as Example 1-1, except that the cathode was made as described above.

Comparison 1-1

A nonaqueous electrolyte secondary battery was obtained in the same manner as Example 1-1, except that no polyvinyl pyrrolidone (PVP) was added, and the amount of the lithium iron phosphate powder was changed to 90 parts by weight.

Comparison 1-2

A nonaqueous electrolyte secondary battery was obtained in the same manner as Example 1-2, except that no polyvinyl pyrrolidone (PVP) was added, the amount of the lithium iron phosphate powder was changed to 85 parts by weight, and the amount of polyvinylidene fluoride (PVdF) was changed to 10 parts by weight.

Comparison 1-3

A nonaqueous electrolyte secondary battery was obtained in the same manner as Example 1-3, except that no polyvinyl pyrrolidone (PVP) was added, and the amount of the lithium manganese iron phosphate powder was changed to 90 parts by weight.

Comparison 1-4

A nonaqueous electrolyte secondary battery was obtained in the same manner as Example 1-4, except that no polyvinyl pyrrolidone (PVP) was added, and the amount of the cathode active material, which had been prepared by mixing lithium iron phosphate powder containing 3 wt % of carbon with lithium manganate having a spinel crystal structure at a ratio of 50:50 in terms of mass ratio, was changed to 90 parts by weight.

Example 2-1

A cathode was made as follows. In the first place, 89.95 parts by weight of lithium iron phosphate powder containing 3 wt % of carbon, 5 parts by weight of polyvinylidene fluoride (PVdF), 5 parts by weight of carbon black, 0.05 parts by weight of polyvinyl pyrrolidone, and an appropriate amount of N-methylpyrrolidone (NMP) were mixed in a mixer. N-methylpyrrolidone (NMP) was added to the mixer and dispersed therein to achieve an intended viscosity, and thus a cathode mix slurry was obtained. The cathode mix slurry was applied to the both sides of an aluminum foil having a thickness of 15 μm, dried, and pressed to form a cathode mix layer. At that time, about 30 mm areas on the both sides of the aluminum foil were remained exposed. The edges of the coated areas on the both sides were generally aligned. Thereafter, the foil was cut into a shape shown in FIG. 4, and thus a cathode was obtained.

Subsequently, a nonaqueous electrolyte secondary battery was obtained in the same manner as Example 1-1, except that the cathode obtained as described above was used.

Example 2-2

A nonaqueous electrolyte secondary battery was obtained in the same manner as Example 2-1, except that the amount of the lithium iron phosphate powder was changed to 89.9 parts by weight, and the amount of polyvinyl pyrrolidone (PVP) was changed to 0.1 parts by weight.

Example 2-3

A nonaqueous electrolyte secondary battery was obtained in the same manner as Example 2-1, except that the amount of the lithium iron phosphate powder was changed to 89.5 parts by weight, and the amount of polyvinyl pyrrolidone (PVP) was changed to 0.5 parts by weight.

Example 2-4

A nonaqueous electrolyte secondary battery was obtained in the same manner as Example 2-1, except that the amount of the lithium iron phosphate powder was changed to 89 parts by weight, and the amount of polyvinyl pyrrolidone (PVP) was changed to 1 part by weight.

Example 2-5

A nonaqueous electrolyte secondary battery was obtained in the same manner as Example 2-1, except that the amount of the lithium iron phosphate powder was changed to 88 parts by weight, and the amount of polyvinyl pyrrolidone (PVP) was changed to 2 parts by weight.

Example 2-6

A nonaqueous electrolyte secondary battery was obtained in the same manner as Example 2-1, except that the amount of the lithium iron phosphate powder was changed to 86 parts by weight, and the amount of polyvinyl pyrrolidone (PVP) was changed to 4 parts by weight.

Comparison 2-1

A nonaqueous electrolyte secondary battery was obtained in the same manner as Example 2-1, except that no polyvinyl pyrrolidone (PVP) was added, and the amount of the lithium iron phosphate powder was changed to 90 parts by weight.

Example 3-1

(Making of Cathode)

A cathode was made as follows. In the first place, 89.5 parts by weight of lithium iron phosphate powder containing 3 wt % of carbon, 5 parts by weight of polyvinylidene fluoride (PVdF), 5 parts by weight of carbon black, 0.5 parts by weight of polyvinyl pyrrolidone (PVP) [K25 manufactured by Wako Pure Chemical Industries, Ltd.] having a weight average molecular weight (Mw) of 35,000, and an appropriate amount of N-methylpyrrolidone (NMP) were mixed in a mixer. N-methylpyrrolidone (NMP) was added to the mixer and dispersed therein to achieve an intended viscosity, and thus a cathode mix slurry was obtained. The cathode mix slurry was applied to the both sides of an aluminum foil having a thickness of 15 μm, dried, and pressed to form a cathode mix layer. At that time, about 30 mm areas on the both sides of the aluminum foil were remained exposed. The edges of the coated areas on the both sides were generally aligned. Thereafter, the foil was cut into a shape shown in FIG. 4, and thus a cathode was obtained.

A nonaqueous electrolyte secondary battery of Example 3-1 was obtained in the same manner as Example 1-1, except that the cathode was made as described above.

Example 3-2

A nonaqueous electrolyte secondary battery was obtained in the same manner as Example 3-1, except that 0.5 parts by weight of polyvinyl pyrrolidone (PVP) [K90 manufactured by Wako Pure Chemical Industries, Ltd.] having a weight average molecular weight of 360,000 was used.

(Evaluation)

The nonaqueous electrolyte secondary batteries made as described above were subjected to the measurement of the discharge capacity maintenance rates 1 to 3 as described below. Measurements of the discharge capacity maintenance rates 2 and 3 were conducted on nonaqueous electrolytes of Examples 2-1 to 2-6, and Comparison 2-1.

(Discharge Capacity Maintenance Rate 1)

A battery was charged at a constant current of 2 C and a constant voltage of 3.6 V, and subsequently discharged at a constant current of 10 C until the battery voltage reached 2.0 V. The charge and discharge cycle was repeated. The discharge capacities after the first and nth cycles were determined, and the discharge capacity maintenance rate was calculated according to Formula 1.

(Discharge capacity maintenance rate 1)=(discharge capacity after nth cycle/discharge capacity after first cycle)×100%     [Formula 1]

(Discharge Capacity Maintenance Rates 2 and 3)

In the first place, a battery was charged at a constant voltage of 3.6 V, a constant current of 0.2 C, and a temperature of 23° C., and then discharged at a constant current of 0.2 C and a temperature of 23° C. to a constant final voltage of 2.0 V. The discharge capacity after the discharge was determined as 0.2 C capacity.

The battery was charged at a constant voltage of 3.6 V, a constant current of 0.2 C, and a temperature of 23° C., and then discharged at a constant current of 5 C and a temperature of 23° C. to a constant final voltage of 2.0 V. The discharge capacity after the discharge was determined as the 5 C capacity.

The battery was charged at a constant voltage of 3.6 V, a constant current of 0.2 C, and a temperature of 23° C., and then discharged at a constant current of 10 C and a temperature of 23° C. to a final voltage of 2.0 V. The discharge capacity after the discharge was determined as the 10 C capacity.

From the 0.2 C, 5 C, and 10 C capacities determined as described above, the discharge capacity maintenance rates 2 and 3 were calculated according to Formulae 2 and 3, respectively.

(Discharge capacity maintenance rate 2)=(5 C discharge capacity after first cycle/0.2 C discharge capacity after first cycle)×100(%)     [Formula 2]

(Discharge capacity maintenance rate 3)=(10 C discharge capacity after first cycle/0.2 C discharge capacity after first cycle)×100(%)     [Formula 3]

Examples 1-1, Comparisons 1-1 and 1-2

Figure 10:
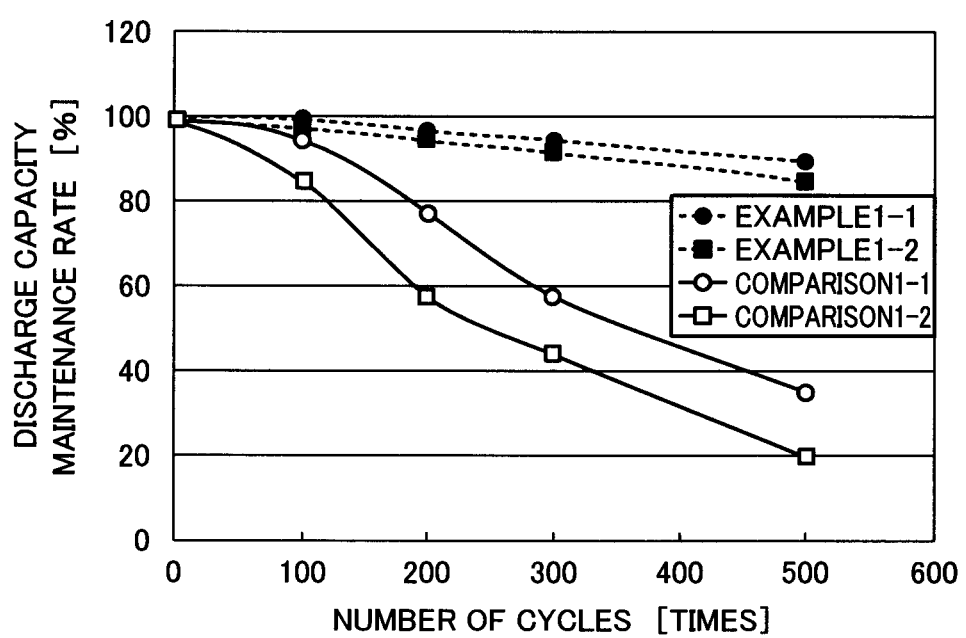
FIG. 10 is a graph showing the evaluation results of Examples 1-1 and 1-2, and Comparisons 1-1 and 1-2.

The results obtained above were evaluated based on the plot of the discharge capacity maintenance rate vs. the number of charge and discharge cycles. FIG. 10 is a plot of the discharge capacity maintenance rate vs. the number of charge and discharge cycles. Table 1 lists the constitution of the cathode mixes.

TABLE 1

| | CATHODE MIX CONSTITUTION (WEIGHT RATIO) | | | |
| --- | --- | --- | --- | --- |
| | LITHIUM IRON PHOSPHATE | CARBON BLACK | PVdF | PVP |
| EXAMPLE 1-1 | 89.5 | 5 | 5 | 0.5 |
| EXAMPLE 1-2 | 84.5 | 5 | 10 | 0.5 |
| COMPARISON 1-1 | 90 | 5 | 5 | — |
| COMPARISON 1-2 | 85 | 5 | 10 | — |

As shown in Table 1 and FIG. 10, the comparisons between Examples 1-1 to 1-2, and Comparisons 1-1 and 1-2 indicate that, in a nonaqueous electrolyte secondary battery including lithium iron phosphate having an olivine crystal structure as the cathode active material, inclusion of polyvinyl pyrrolidone (PVP) in the cathode improves the life characteristics of the battery during high current discharge.

Example 1-3, Comparison 1-3

Figure 11:
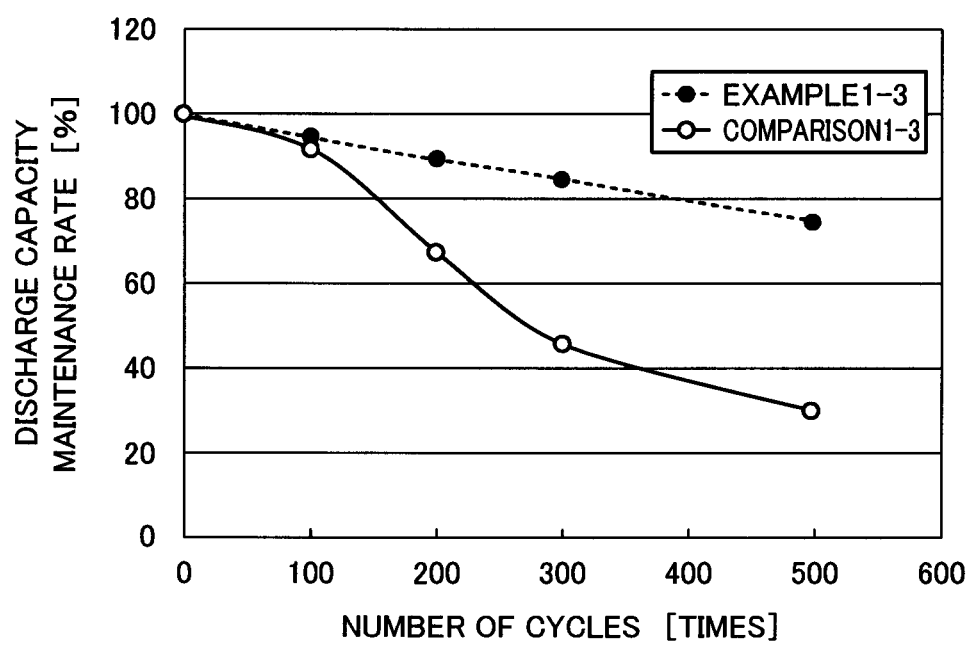
FIG. 11 is a graph showing the evaluation results of Example 1-3 and Comparison 1-3.

The results obtained above were evaluated based on the plot of the discharge capacity maintenance rate vs. the number of charge and discharge cycles. FIG. 11 is a plot of the discharge capacity maintenance rate vs. the number of charge and discharge cycles. Table 2 lists the constitution of the cathode mixes.

TABLE 2

| | CATHODE MIX CONSTITUTION (WEIGHT RATIO) | | | |
| --- | --- | --- | --- | --- |
| | LITHIUM MANGANESE IRON PHOSPHATE | CARBON BLACK | PVdF | PVP |
| EXAMPLE 1-3 | 89.5 | 5 | 5 | 0.5 |
| COMPARISON 1-3 | 90 | 5 | 5 | — |

As shown in Table 2 and FIG. 11, the comparison between Example 1-3 and Comparison 1-3 indicates that, in a nonaqueous electrolyte secondary battery including lithium manganese iron phosphate having an olivine crystal structure as the cathode active material, inclusion of polyvinyl pyrrolidone (PVP) in the cathode improves the life characteristics of the battery during high current discharge.

Example 1-4, Comparison 1-4

Figure 12:
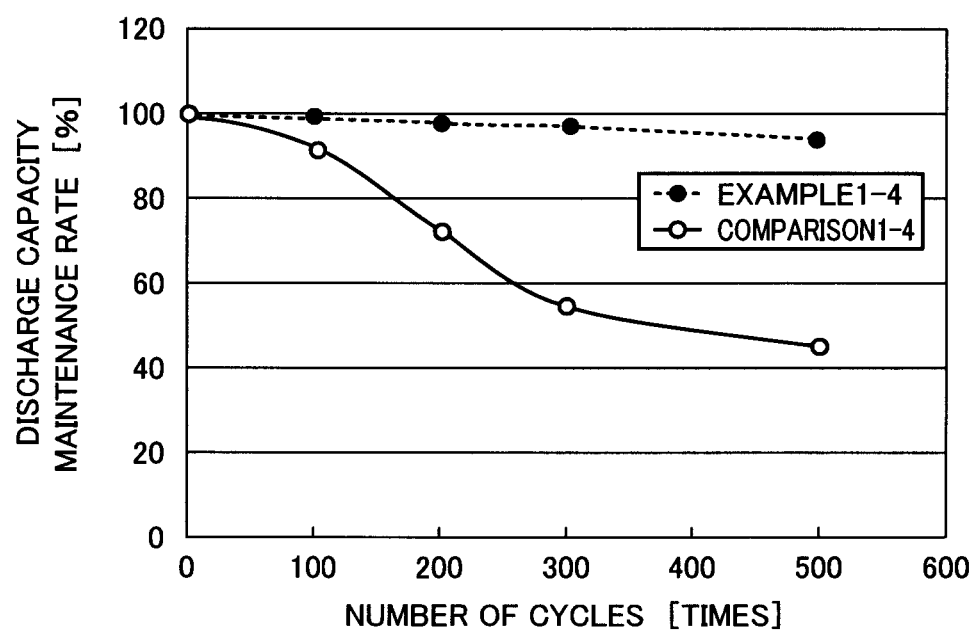
FIG. 12 is a graph showing the evaluation results of Example 1-4 and Comparison 1-4.

The results obtained above were evaluated based on the plot of the discharge capacity maintenance rate vs. the number of charge and discharge cycles. FIG. 12 is a plot of the discharge capacity maintenance rate vs. the number of charge and discharge cycles. Table 3 lists the constitution of the cathode mixes.

TABLE 3

| | CATHODE MIX CONSTITUTION (WEIGHT RATIO) | | | |
|---|---|---|---|---|
| | CATHODE ACTIVE MATERIAL | CARBON BLACK | PVdF | PVP |
| EXAMPLE 1-4 | 89.5 | 5 | 5 | 0.5 |
| COMPARISON 1-4 | 90 | 5 | 5 | — |

CATHODE ACTIVE MATERIAL: LITHIUM IRON PHOSPHATE: LITHIUM MANGANATE (50:50)

As shown in Table 3 and FIG. 12, the comparison between Example 1-4 and Comparison 1-4 indicates that, in a nonaqueous electrolyte secondary battery including a mixture of lithium manganate having a spinel crystal structure with lithium iron phosphate having an olivine crystal structure as the cathode active material, inclusion of polyvinyl pyrrolidone (PVP) in the cathode improves the life characteristics of the battery during high current discharge.

Examples 2-1 to 2-6, Comparison 2-1

Figure 13:
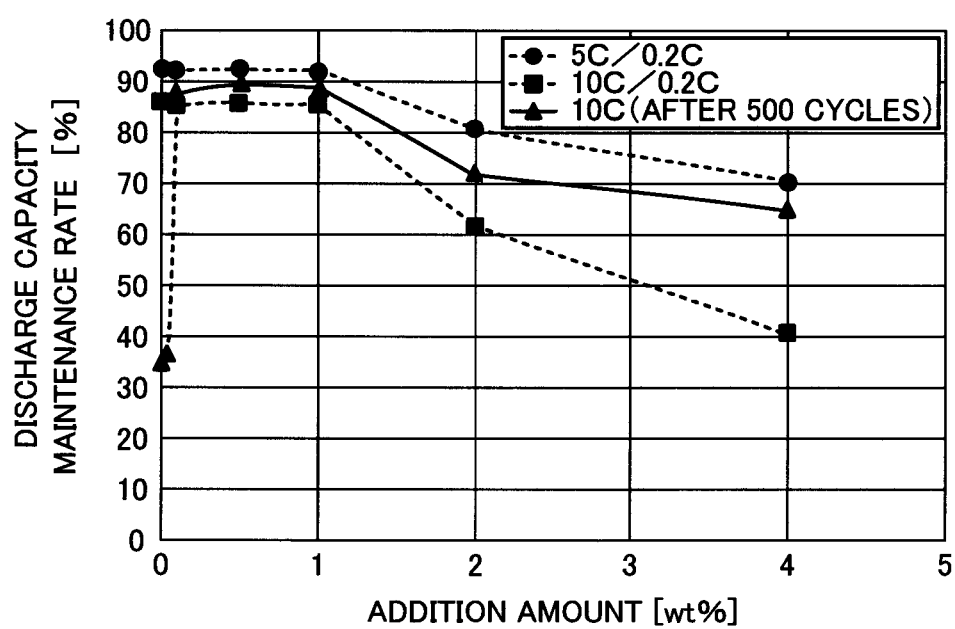
FIG. 13 is a graph showing the evaluation results of Examples 2-1 to 2-6 and Comparison 2-1.

The results obtained above were evaluated based on the plot of the discharge capacity maintenance rate vs. the Addition amount. FIG. 13 is a plot of the discharge capacity maintenance rate vs. the addition amount. Table 4 lists the constitution of the cathode mixes.

TABLE 4

| | CATHODE MIX CONSTITUTION (WEIGHT RATIO) | | | | PVP/ CATHODE ACTIVE MATERIAL [wt %] |
|---|---|---|---|---|---|
| | LITHIUM IRON PHOSPHATE | CARBON BLACK | PVdF | PVP | |
| EXAMPLE 2-1 | 89.95 | 5 | 5 | 0.05 | 0.056 |
| EXAMPLE 2-2 | 89.9 | 5 | 5 | 0.1 | 0.111 |
| EXAMPLE 2-3 | 89.5 | 5 | 5 | 0.5 | 0.559 |
| EXAMPLE 2-4 | 89 | 5 | 5 | 1 | 1.124 |
| EXAMPLE 2-5 | 88 | 5 | 5 | 2 | 2.273 |
| EXAMPLE 2-6 | 86 | 5 | 5 | 4 | 4.651 |
| COMPARISON 2-1 | 90 | 5 | 5 | — | 0 |

As shown in Table 4 and FIG. 13, the comparisons between Examples 2-1 to 2-6, and Comparison 2-1 indicate that, in a nonaqueous electrolyte secondary battery including lithium iron phosphate having an olivine crystal structure as the cathode active material, inclusion of polyvinyl pyrrolidone (PVP) in the cathode improves the life characteristics of the battery during high current discharge. It has been also indicated that the inclusion of PVP at a ratio of less than 0.111 wt % is poorly effective for improving the life characteristics during high current discharge, and more than 1.124 wt % is poorly effective for improving the high current discharge capacity and the life characteristics in the initial stages.

Example 3-1 and Example 3-2

Figure 14:
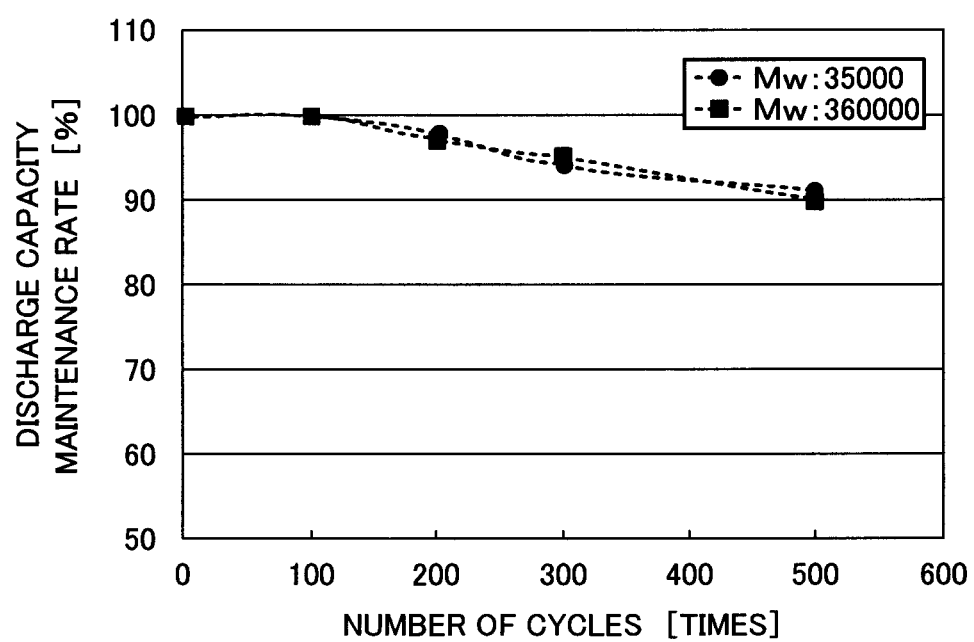
FIG. 14 is a graph showing the evaluation results of Examples 3-1 and 3-2.

The results obtained above were evaluated based on the plot of the discharge capacity maintenance rate vs. the number of charge and discharge cycles. FIG. 14 is a plot of the discharge capacity maintenance rate vs. the number of charge and discharge cycles. Table 5 lists the constitution of the cathode mixes.

TABLE 5

| | CATHODE MIX CONSTITUTION (WEIGHT RATIO) | | | | AVERAGE MOLECULAR WEIGHT OF PVP |
|---|---|---|---|---|---|
| | CATHODE ACTIVE MATERIAL | CARBON BLACK | PVdF | PVP | |
| EXAMPLE 3-1 | 89.5 | 5 | 5 | 0.5 | 35000 |
| EXAMPLE 3-2 | 89.5 | 5 | 5 | 0.5 | 360000 |

As shown in Table 5 and FIG. 14, the comparison between Examples 3-1 and 3-2 indicates that, in a nonaqueous electrolyte secondary battery including lithium iron phosphate having an olivine crystal structure as the cathode active material, inclusion of polyvinyl pyrrolidone (PVP) having a weight average molecular weight of 35000 to 360000 in the cathode improves the life characteristics of the battery during high current discharge.

The present application has been illustrated above with reference to embodiments and examples. However, the present application is not limited to the embodiments and examples. It should be understood by those skilled in the art that various modifications, combinations, sub-combinations and alterations may occur depending on design requirements and other factors insofar as they are within the scope of the appended claims or the equivalents thereof.

For example, the numerical values cited in the embodiments and examples merely illustrative, and other numerical values may be used as necessary.

In the embodiments and examples described above, the present application has been applied to flat and cylindrical nonaqueous electrolyte secondary batteries. However, the shape of the battery is not particularly limited, and the nonaqueous electrolyte secondary battery may be, for example, coin-shaped, button-shaped, or square.

In the embodiments and examples described above, the electrolyte is an electrolytic solution or a gel. Instead of these electrolytes, other electrolytes may be used. Examples of other electrolytes include a polymer solid electrolyte composed of an ion conductive polymer, and an inorganic solid electrolyte composed of an ion conductive inorganic material, which may be used alone or in combination with other electrolyte. Examples of polymer compounds which may be used as a polymer solid electrolyte include polyether, polyester, polyphosphazene, and polysiloxane. Examples of inorganic solid electrolytes include ion conductive ceramics, ion conductive crystals, and ion conductive glass.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A cathode mix for nonaqueous electrolyte secondary batteries, comprising:
   a cathode active material having an olivine crystal structure;
   polyvinyl pyrrolidone, wherein a content of the polyvinyl pyrrolidone is from 0.111 wt % to 1.124 wt % with reference to the cathode active material having an olivine crystal structure; and
   a binder comprising polyvinylidene fluoride.

2. The cathode mix for nonaqueous electrolyte secondary batteries according to claim 1, wherein the cathode active material has an average composition expressed by Chemical Formula 1:

$$Li_xM1PO_4 \quad \text{(Chemical Formula 1)}$$

wherein M1 represents at least one selected from the group consisting of cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr; x is a value within the range of $0.9 \leq x \leq 1.1$; the composition of lithium varies depending on the state of charge and discharge, and x is a value in a state of full discharge.

3. The cathode mix for nonaqueous electrolyte secondary batteries according to claim 1, wherein the cathode mix is dispersed in N-methylpyrrolidone.

4. The cathode mix for nonaqueous electrolyte secondary batteries according to claim 1, wherein the cathode active material has a primary particle diameter of about 0.1 μm to about 1.0 μm.

5. The cathode mix for nonaqueous electrolyte secondary batteries according to claim 1, wherein a content of the polyvinyl pyrrolidone is from 0.1 wt % to 1 wt % with respect to a total weight of the cathode mix, and a content of the polyvinylidene fluoride is from 5 wt % to 10 wt % with respect to the total weight of the cathode mix.

6. A nonaqueous electrolyte secondary battery comprising:
   a cathode;
   an anode; and
   a nonaqueous electrolyte,
   wherein the cathode includes a cathode mix comprising:
   a cathode active material having an olivine crystal structure;
   polyvinyl pyrrolidone, wherein a content of the polyvinyl pyrrolidone is from 0.111 wt % to 1.124 wt % with reference to the cathode active material having an olivine crystal structure; and
   a binder comprising polyvinylidene fluoride.

7. The nonaqueous electrolyte secondary battery according to claim 6, wherein the cathode active material has an average composition expressed by Chemical Formula 1:

$$Li_xM1PO_4 \quad \text{(Chemical Formula 1)}$$

wherein M1 represents at least one selected from the group consisting of cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr; x is a value within the range of $0.9 \leq x \leq 1.1$; the composition of lithium varies depending on the state of charge and discharge, and x is a value in a state of full discharge.

8. The nonaqueous electrolyte secondary battery according to claim 6, wherein the cathode mix is dispersed in N-methylpyrrolidone.

9. The nonaqueous electrolyte secondary battery according to claim 6, wherein the cathode active material has a primary particle diameter of about 0.1 μm to about 1.0 μm.

10. The nonaqueous electrolyte secondary battery according to claim 6, wherein a content of the polyvinyl pyrrolidone is from 0.1 wt % to 1 wt % with respect to a total weight of the cathode mix, and a content of the polyvinylidene fluoride is from 5 wt % to 10 wt % with respect to the total weight of the cathode mix.

* * * * *